United States Patent
Lee et al.

(10) Patent No.: US 10,177,359 B2
(45) Date of Patent: Jan. 8, 2019

(54) SEPARATOR FOR ELECTROCHEMICAL DEVICE AND METHOD FOR MANUFACTURING THE SAME

(71) Applicant: LG Chem, Ltd., Seoul (KR)

(72) Inventors: Joo-Sung Lee, Daejeon (KR); Su-Jin Yoon, Daejeon (KR); Dong-Wook Sung, Daejeon (KR); Da-Kyung Han, Daejeon (KR); Kyung-Ryun Ka, Daejeon (KR); Jong-Hun Kim, Daejeon (KR)

(73) Assignee: LG Chem, Ltd. (KR)

( * ) Notice: Subject to any disclaimer, the term of this patent is extended or adjusted under 35 U.S.C. 154(b) by 196 days.

(21) Appl. No.: 14/438,015

(22) PCT Filed: Mar. 20, 2014

(86) PCT No.: PCT/KR2014/002357
§ 371 (c)(1),
(2) Date: Apr. 23, 2015

(87) PCT Pub. No.: WO2014/148841
PCT Pub. Date: Sep. 25, 2014

(65) Prior Publication Data
US 2015/0280192 A1    Oct. 1, 2015

(30) Foreign Application Priority Data

Mar. 20, 2013    (KR) ........................ 10-2013-0029779
Mar. 20, 2014    (KR) ........................ 10-2014-0032577

(51) Int. Cl.
*H01M 2/00* (2006.01)
*H01M 2/16* (2006.01)
(Continued)

(52) U.S. Cl.
CPC ............. *H01M 2/16* (2013.01); *H01M 2/145* (2013.01); *H01M 2/1653* (2013.01); *H01M 2/18* (2013.01);
(Continued)

(58) Field of Classification Search
CPC .......... H01M 2/16; H01M 2/145; H01M 2/18; H01M 2/1653; H01M 10/052
See application file for complete search history.

(56) References Cited

U.S. PATENT DOCUMENTS

| | | |
|---|---|---|
| 2004/0213985 A1 | 10/2004 | Lee et al. |
| 2004/0246657 A1 | 12/2004 | Norton |

(Continued)

FOREIGN PATENT DOCUMENTS

| | | |
|---|---|---|
| CN | 102916150 A | 2/2013 |
| EP | 0676773 A1 | 10/1995 |

(Continued)

OTHER PUBLICATIONS

Full translation of Xiao-Hua et al. "Preparation of Microporous Membranes by Swift Heavy Ion Irradiation and Impedance Characterization", published Jun. 30, 2010 (Year: 2010).*

(Continued)

*Primary Examiner* — Nicholas P D'Aniello
(74) *Attorney, Agent, or Firm* — Lerner, David, Littenberg, Krumholz & Mentlik, LLP

(57) ABSTRACT

The present disclosure relates to a separator for an electrochemical device with pores having predetermined diameter, permeation time, and tortuosity, to allow for smooth movement of lithium ions and a method for manufacturing the same, and smooth movement of lithium ions may be optimized by the separator for an electrochemical device.

9 Claims, 4 Drawing Sheets

(51) Int. Cl.
*H01M 2/14* (2006.01)
*H01M 2/18* (2006.01)
*H01M 10/052* (2010.01)

(52) U.S. Cl.
CPC ...... *H01M 10/052* (2013.01); *H01M 2220/30* (2013.01)

(56) References Cited

U.S. PATENT DOCUMENTS

| | | |
|---|---|---|
| 2010/0009265 A1 | 1/2010 | Hatayama et al. |
| 2013/0011799 A1 | 1/2013 | Pullini et al. |
| 2013/0089770 A1 | 4/2013 | Nishikawa |

FOREIGN PATENT DOCUMENTS

| | | |
|---|---|---|
| JP | H07122255 A | 5/1995 |
| JP | H11130900 A | 5/1999 |
| JP | 2004031084 A | 1/2004 |
| JP | 2008255307 A | 10/2008 |
| JP | 2011210574 A | 10/2011 |
| KR | 100409017 B1 | 12/2003 |
| KR | 20100072825 A | 7/2010 |
| KR | 20120046101 A | 5/2012 |
| WO | 2010093368 A1 | 8/2010 |
| WO | 2011117692 A1 | 9/2011 |
| WO | 2012137375 A1 | 10/2012 |

OTHER PUBLICATIONS

Apel, P.Yu., et al., "Structure of polycrbonate track-etch membrances: Origin of the "paradoxical" pore shape." Journal of Membrane Science, vol. 282, 2006, pp. 393-400.

International Search Report for Application No. PCT/KR2014/002357 dated Jul. 7, 2014.

Search Report from European Application No. 14767428.7, dated Apr. 29, 2016.

Xiao-Hua et al., "Preparation of Microporous Membranes by Swift Heavy Ion Irradiation and Impedance Characterization", Acta Phys.-Chim. Sin., Jun. 30, 2010, vol. 26(6), pp. 1722-1726 (English translation of abstract provided herewith).

\* cited by examiner

SEPARATOR FOR ELECTROCHEMICAL DEVICE AND METHOD FOR MANUFACTURING THE SAME

CROSS-REFERENCE TO RELATED APPLICATIONS

The present application is a national phase entry under 35 U.S.C. § 371 of International Application No. PCT/KR2014/002357 filed Mar. 20, 2014, published in Korean, which claims priority from Korean Application No. 10-2013-0029779 filed Mar. 20, 2013 and Korean Application No. 10-2014-0032577 filed Mar. 20, 2014, all of which are hereby incorporated herein by reference.

TECHNICAL FIELD

The present disclosure relates to a separator for an electrochemical device and a method for manufacturing the same, and more particularly, to a separator for an electrochemical device with pores having proper diameter and tortuosity to allow for smooth movement of lithium ions and a method for manufacturing the same.

BACKGROUND ART

Recently, with the development of the hi-tech electronic industry, miniaturization and lightweight of electronic equipment became feasible, and use of portable electronic devices is increasing. As a power source of portable electronic devices, the need for batteries with high energy density is growing and research for lithium secondary batteries are being actively conducted. A lithium secondary battery includes a cathode, an anode, and an electrolyte solution, and a separator is generally provided between the cathode and the anode to prevent a phenomenon in which a short circuit occurs by a direct contact between the cathode and the anode.

A separator for an electrochemical device has been manufactured from various resins including polyolefin-based polymer resin such as polyethylene or polypropylene. However, polyolefin-based polymer resin such as polyethylene or polypropylene is prone to shrink at high temperature due to having a low melting point of about 130 to 150° C., and it has been noted that a resulting internal short circuit causes a problem of explosion.

Meanwhile, as a method for forming pores in a substrate of a separator for an electrochemical device, a dry pore forming method or a wet pore forming method is well known, and the dry pore forming method melts a material compound, adjusts crystallization kinetics, and forms pores mechanically during stretching, and the wet pore forming method melts a material compound for a separator substrate for an electrochemical device, blends it with a wax and the like, extrudes the blend, and extract the wax to form pores. However, the separator substrate manufactured by this method fails to have a pore tortuosity (straightness) sufficient to allow smooth movement of lithium ions.

Accordingly, there is still the need for development of a separator for an electrochemical device which provides a wide selection of materials and allows for more smooth movement of lithium ions.

DISCLOSURE

Technical Problem

The present disclosure is designed to provide a method for manufacturing a separator wherein the separator may be manufactured with various materials. Also, the present disclosure is designed to provide a separator for an electrochemical device manufactured by the method which has pores with a specific numerical range of diameter and tortuosity to allow for smooth movement of lithium ions and a proper porosity (permeation time), and an electrochemical device comprising the same.

Technical Solution

According to an aspect of the present disclosure, there is provided a separator for an electrochemical device including a film with pores having a diameter from 1 to 100 nm and tortuosity in a range of 1 to 2, and having a permeation time of 5 to 500 sec/100 cc.

The pores may be formed in a cylindrical shape.

A substrate of the separator may be formed from any one selected from the group consisting of fluoropolymer, polyethylene, low density polyethylene, linear low density polyethylene, ultrahigh molecular weight polyethylene, polypropylene, polyethyleneterephthalate, polybutyleneterephthalate, polyester, polyacetal, polyamide, polycarbonate, polyimide, polyetheretherketone, polyethersulfone, polyphenyleneoxide, polyphenylenesulfidro, polyethylenenaphthalene, polysulfone, cellulose acetate, and polystyrene, or mixtures.

According to another aspect of the present disclosure, there is provided an electrochemical device comprising a cathode, an anode, a separator interposed between the cathode and the anode, and an electrolyte solution, wherein the separator is the above separator.

The electrochemical device may be a lithium secondary battery.

According to another aspect of the present disclosure, there is provided a method for manufacturing a separator for an electrochemical device, comprising irradiating an ion beam onto a film for a separator substrate to obtain a tracked film, and applying an etching solution to the tracked film to form pores in the film.

The etching solution may be any one selected from the group consisting of sodium hydroxide (NaOH), potassium hydroxide (KOH), calcium hydroxide (Ca(OH)$_2$), sodium hypochlorite (NaClO), and hydrogen peroxide (H$_2$O$_2$), or mixtures thereof.

The ion beam may have an acceleration voltage in a range of 100 to 300 MeV.

Also, the etching solution may have concentration from 1 to 10 M.

Also, the etching solution may be applied to the film for 1 to 30 minutes.

The ion beam may be irradiated at a right angle to the film.

Advantageous Effects

A separator according to an exemplary embodiment of the present disclosure has an advantage of a very uniform pore size over a separator manufactured by a typical dry/wet manufacturing method.

Also, the separator according to an exemplary embodiment of the present disclosure has an advantage of more smooth movement of lithium ions due to cylindrical pores having little or no tortuous nature, and consequently, a secondary battery employing the separator has an advantage of improved output.

Also, a method for manufacturing a separator according to an exemplary embodiment of the present disclosure facilitates the adjustment of an etching time of a porous substrate by adjusting a time of ion beam irradiation, and thus has an advantage of easy porosity adjustment.

Besides, there is an advantage of manufacturing a separator from various materials.

BEST MODE FOR CARRYING OUT THE INVENTION

Figure 1:
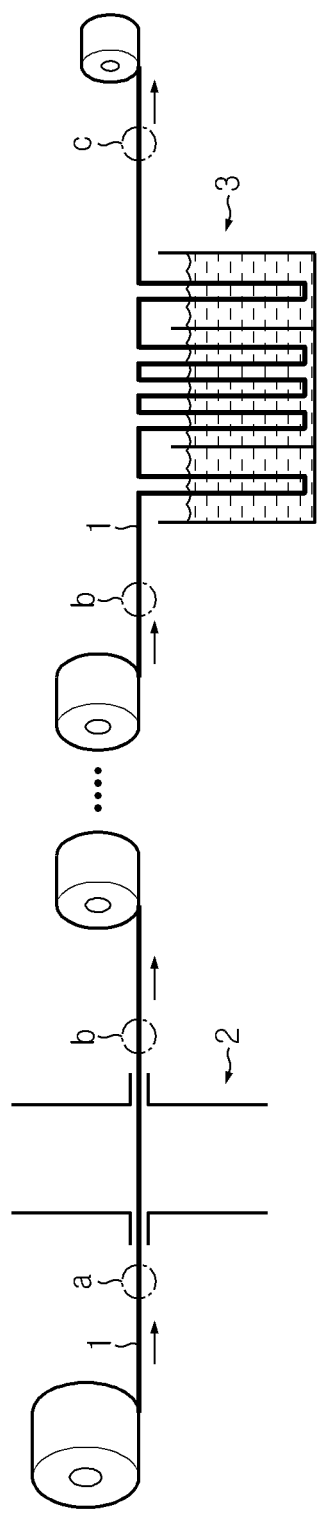
FIG. 1 is a schematic diagram illustrating a method for manufacturing a separator according to an exemplary embodiment of the present disclosure.

Hereinafter, the present disclosure will be described in detail. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Hereinafter, the present disclosure is described in more detail with reference to the accompanying drawings.

The present disclosure provides a separator for an electrochemical device with pores having a diameter of 1 to 100 nm and tortuosity in a range of 1 to 2 and having a permeation time of 5 to 500 sec/100 cc.

The term 'pore diameter' as used herein should be understood as representing a longest pore diameter.

The pore formed in the separator may have a diameter of 1 to 100 nm or 5 to 80 nm, and a permeation time of the separator may be in a range of 5 to 500 s/100 cc or 10 to 350 s/100 cc. When the pore diameter and the permeation time are less than the lower limit, smooth movement of lithium ions may not be ensured, and when the pore diameter and the permeation time exceed the upper limit, the mechanical properties of the separator may unnecessarily reduce.

The term 'tortuosity' as used herein represents an index for indicating how tortuous the pores are, and may be calculated by dividing an actual distance a molecule moving within the pore space travels between two points by a straight line distance between those two points. That is, tortuosity equal to 1 represents pores in which a flow path is straight, and as the tortuosity becomes greater than 1, the tortuosity of the pores increases.

The tortuosity of the pores formed in the separator according to an exemplary embodiment of the present disclosure is preferably in a range of 1 to 2, and when the tortuosity is greater than the upper limit, smooth movement of lithium ions may not be ensured. That is, the separator according to an exemplary embodiment of the present disclosure features cylindrical pores having little or no tortuous nature. This pore structure allows for smooth movement of lithium ions, resulting in an effect of improving the output of an electrochemical device.

The term 'cylindrical pore' or 'cylindrically shaped pore' as used herein represents a pore formed through the top and the bottom of the separator, of which a cross section is circular or nearly circular on both the top and the bottom, and each cross section at the top and the bottom has the same or similar size.

Also, the separator according to an exemplary embodiment of the present disclosure features pores of a uniform size. That is, a pore size is very uniform when compared to a separator manufactured by a typical dry or wet method for manufacturing a separator.

A film for a porous substrate may be made from any material without special limitations if the material is susceptible to track etching and may be used as a separator for an electrochemical device.

Non-limiting examples of film materials may include any one selected from the group consisting of fluoropolymer, polyethylene, low density polyethylene, linear low density polyethylene, ultrahigh molecular weight polyethylene, polypropylene, polyethyleneterephthalate, polybutyleneterephthalate, polyester, polyacetal, polyamide, polycarbonate, polyimide, polyetheretherketone, polyethersulfone, polyphenyleneoxide, polyphenylenesulfidro, polyethylenenaphthalene, polysulfone, cellulose acetate, and polystyrene, or mixtures thereof. Preferably, the film is a polyethyleneterephthalate film.

Using the above film material, the film may be made by a common method in the art, and its exemplary embodiment is provided below for illustration, but the film making method is not limited thereto.

The resin of the film material may be blended, if necessary, with an additive such as an antioxidant, a plasticizer, a flame retardant, a coloring agent, a compatibilizer, and the like, using a proper mixer, for example, a twin screw extruder or a banbury mixer. The obtained blend may be formed into a film using a typical film forming method of a thermoplastic resin, for example, T-die extrusion or film blowing.

To increase the elastic recovery rate of the resulting film greater than or equal to 50%, annealing may be performed.

The film for the porous substrate made as above may have a thickness in a range of 1 to 100 μm or 5 to 50 μm. When the film has a thickness in the above range, pores desired by the manufacturing method according to an exemplary embodiment of the present disclosure may be preferably formed, and it is preferred in terms of durability and prevention of unnecessary volume expansion of the separator.

Subsequently, a film (b) with tracked portions may be obtained by a process of irradiating an ion beam 2 onto the film (a) for the porous substrate (see FIG. 1).

The irradiated ion beam 2 may be an ion beam of an atom selected from argon, krypton, xenon, bismuth, and combinations thereof.

A density of the tracks formed by irradiating the ion beam 2, that is, a number of tracks 11 per surface area unit of the film generated by the ion beam may be determined based on permeability (permeation time) intended to achieve in the porous substrate, and the track density is not specially limited.

The irradiation of the ion beam 2 may be performed, in a chamber, during ion beam processing, with ion beam acceleration voltage from 100 to 300 MeV at an ion beam incident angle in a range of 0° to 90° with respect to the surface of the film, preferably, at a right angle.

An ion beam irradiation time is not specially limited, but as the irradiation time increases, an amount of irradiated ions increases and consequently a number of tracks being formed increases.

Subsequently, the film (b) with tracked portions obtained by the ion beam irradiation is immersed in or passes through a bath 3 containing an etching solution, to form a porous film (c) in which pores are formed from the tracked portions. The etching solution may differ based on a type of the film, and should dissolve the tracked portions formed in the film while not causing a chemical reaction with the film. The etching solution may include, as a non-limiting example, sodium hydroxide (NaOH), potassium hydroxide (KOH), calcium hydroxide ($Ca(OH)_2$), sodium hypochlorite (NaClO), and hydrogen peroxide ($H_2O_2$). Preferably, the etching solution is sodium hydroxide (NaOH) or potassium hydroxide (KOH).

The etching solution having concentration from 1 to 10 M or from 2 to 7 M may effectively remove the tracks while preventing damage to the film.

A preferred etching temperature is in a range of 40 to 80° C.

An etching time may change based on desired pore diameter and film thickness, but is preferably from 1 to 30 minutes in terms of preventing unnecessary time waste while substantially forming the pores.

Figure 2A:
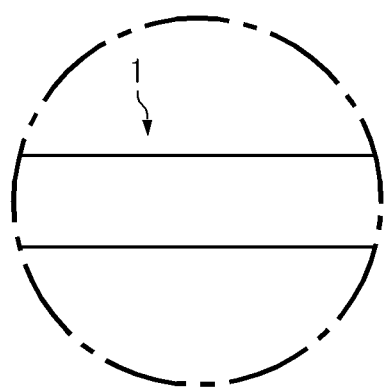
FIGS. 2a, 2b, and 2c are schematic diagrams illustrating a film before a process for pore formation (FIG. 2a), a film in which tracks are formed by ion beam irradiation (FIG. 2b), and a porous film with pores (FIG. 2c).
Figure 2B:
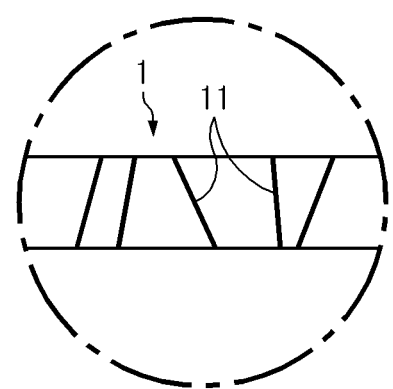
Figure 2C:
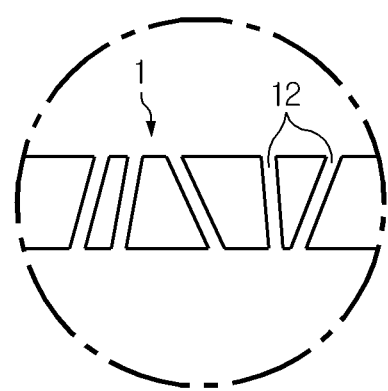

In the process according to an exemplary embodiment of the present disclosure, changes of the film (1) at each process stage, that is, the film (a) before the tracks are formed, the film (b) after the tracks are formed, and the film (c) after the pores are formed are shown in FIGS. 2a, 2b, and 2c, respectively, and the tracks 11 formed in the film 1 can be seen from FIG. 2b and the pores 12 formed in the film 1 can be seen from FIG. 2c.

The film with the pores is washed and dried by a typical method in the art.

The porous substrate according to an exemplary embodiment of the present disclosure may be used as a separator for an electrochemical device. Non-limiting examples of electrochemical devices in which the separator according to an exemplary embodiment of the present disclosure may be employed may include any device which causes an electrochemical reaction, specifically, for example, all types of primary batteries, secondary batteries, fuel cells, solar cells, or capacitors such as super-capacitors. In particular, among the secondary batteries, a lithium secondary battery is preferred, including a lithium metal secondary battery, a lithium ion secondary battery, a lithium polymer secondary battery, or a lithium ion polymer secondary battery.

There is no special limitation on an electrode to be applied to the electrochemical device according to an exemplary embodiment of the present disclosure, and an electrode may be manufactured by binding an electrode active material to a current collector by a typical method known in the art.

Of the electrode active material, a cathode active material may include, as a non-limiting example, a general cathode active material usable in a cathode of a conventional electrochemical cell, in particular, lithium manganese oxide, lithium cobalt oxide, lithium nickel oxide, lithium iron oxide, or lithium composite oxides thereof.

An anode active material may include, as a non-limiting example, a general anode active material usable in an anode of a conventional electrochemical cell, in particular, a lithium adsorption material such as a lithium metal or a lithium alloy, carbon, petroleum coke, activated carbon, graphite, or other carbons.

A cathode current collector may be, as a non-limiting example, a foil made from aluminum, nickel, or a combination thereof, and an anode current collector may be, as a non-limiting example, a foil made from copper, gold, a nickel or copper alloy, or combinations thereof.

An electrolyte solution usable in the present disclosure may be an electrolyte solution in which an electrolyte salt, for example, of $A^+B^-$ structure, where $A^+$ represents an alkali metal cation such as $Li^+$, $Na^+$ and $K^+$, or combinations thereof, and $B^-$ represents an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$ and $C(CF_2SO_2)_3^-$, or combinations thereof, is dissolved or dissociated in an electrolyte solvent selected from the group consisting of, but not limited to, propylene carbonate (PC), ethylene carbonate (EC), diethyl carbonate (DEC), dimethyl carbonate (DMC), dipropyl carbonate (DPC), dimethylsulfoxide, acetonitrile, dimethoxyethane, diethoxyethane, tetrahydrofuran, N-methyl-2-pyrrolidone (NMP), ethylmethylcarbonate (EMC), gamma butyrolactone, or mixtures thereof.

Injection of the electrolyte solution may be performed in a proper step among a battery fabrication process based on a manufacturing process and required physical properties of a final product. That is, injection of the electrolyte solution may be applied before battery assembling or in a final step of battery assembling.

Optionally, the electrode according to the present invention may further include a conductive material, a binder, a filler, and the like, according to necessity.

The conductive material may include, but is not limited to, acetylene black, carbon black, and the like.

Preferably, the binder used in the anode and the cathode may be at least one selected from the group consisting of polytetrafluoroethylene, polyvinylidene fluoride, polyvinyl fluoride, polyacrylonitrile, nitrile rubber, polybutadiene, polystyrene, styrene butadiene rubber, polysulfide rubber, butyl rubber, hydrogenated styrene butadiene rubber, nitrocellulose, and carboxymethylcellulose.

The battery according to the present disclosure may be manufactured by a typical method known in the art, for example, by dispersing an electrode active material and a binder in an organic solvent to prepare a slurry, coating the slurry on an electrode current collector, drying and compressing the result to make an electrode assembly with a separator interposed between a cathode and an anode, and pouring a non-aqueous electrolyte solution.

MODE FOR CARRYING OUT THE INVENTION

Hereinafter, a separator and a method for manufacturing an electrochemical device comprising the same according to the present disclosure is described in detail with reference to embodiments, but it should be understood that the present disclosure is not limited to the following embodiments.

Embodiment Example 1-1: Manufacture of Separator

A 12 μm thick polyethyleneterephthalate (PET) specimen manufactured in film form was prepared in size of 5 cm×5 cm. The specimen was put in a vacuum chamber maintaining a degree of vacuum less than or equal to 0.01 mTorr, and irradiated with 170 MeV xenon ion in the ion vacuum chamber in a fixed perpendicular orientation to the surface of the specimen.

Subsequently, the specimen was etched in 4 M sodium hydroxide solution with addition of 0.05 wt % of Dowfax 2A1 (Dow Chemicals) at 60° C. for 10 minutes. Subsequently, a film with pores was washed with distilled water and dried to obtain a porous substrate for a separator.

The porous substrate with pores having a diameter of 30 nm on average had a permeation time of 120 s/100 cc, and tortuosity of the pores was equal to 1 when measured in cross section.

Embodiment Example 1-2: Fabrication of Lithium Secondary Battery

Manufacture of Anode

An anode mix slurry was prepared from 96 wt % of carbon powder as an anode active material, 3 wt % of polyvinylidene fluoride (PVdF) as binder polymer, and 1 wt % of carbon black as a conductive material with addition of N-methyl-2-pyrrolidone (NMP) as a solvent. The anode mix slurry was coated on a 10 μm thick copper (Cu) foil as an anode current collector and dried to manufacture an anode, followed by roll pressing.

Manufacture of Cathode

A cathode mix slurry was prepared from 92 wt % of lithium cobalt composite oxide as a cathode active material, 4 wt % of carbon black as a conductive material, and 4 wt % of PVdF as binder polymer with addition of N-methyl-2-pyrrolidone (NMP) as a solvent. The cathode mix slurry was coated on a 20 μm thick aluminum (Al) foil as a cathode current collector and dried to manufacture a cathode, followed by roll pressing.

Manufacture of Battery

A battery was manufactured using the separator manufactured in Embodiment example 1-1, along with the cathode and the anode manufactured in the foregoing. The cathode, the anode, and the separator were assembled by a stacking method, and an electrolyte solution (ethylene carbonate (EC)/ethylmethylcarbonate (EMC)=1/2 (volumetric ratio), lithiumhexafluorophosphate (LiPF$_6$) 1 mol) was poured into the assembled battery, to yield a complete battery.

Comparative Example 1-1: Manufacture of Separator

A porous substrate for a separator was manufactured by the same method as Embodiment example 1-1 except an etching time was changed to 12 hours.

The resulting porous substrate with fine pores having a pore diameter of 500 nm on average had a permeation time of 0 s/100 cc, and the measure of tortuosity of the pores was equal to 1 when observed in cross section.

Comparative Example 1-2: Fabrication of Lithium Secondary Battery

A lithium secondary battery was fabricated by the same method as Embodiment example 1-2 except the separator of Comparative example 1-1 was used.

Experiment Example 1

After each of the separator of Embodiment example 1-1 and the separator of Comparative Example 1-1 was interposed between the cathode and the anode, activation was performed by pouring the electrolyte solution. The lithium secondary battery of Embodiment example performed normal charging and discharging, but the lithium secondary battery of Comparative example failed to terminate charging in a CV (constant voltage) range.

What is claimed is:

1. A separator for an electrochemical device, comprising:
   a porous substrate consisting of a single layer, the single layer comprising a polymer,
   wherein the single layer has a permeation time of 5 to 500 s/100 cc and pores having a diameter from 1 to 100 nm,
   wherein the pores extend from a first side of the porous substrate to a second side of the porous substrate, the first side and the second side of the porous substrate separated by a thickness of the porous substrate,
   wherein the pores have a cylindrical shape, the cylindrical shape having little or no tortuous nature, where no tortuous nature is equivalent to a tortuosity of 1,
   wherein the polymer is selected from the group consisting of polyethylene, low density polyethylene, linear low density polyethylene, ultrahigh molecular weight polyethylene, polypropylene, polyethyleneterephthalate, polybutyleneterephthalate, polyester, polyacetal, polyamide, polycarbonate, polyimide, polyetheretherketone, polyethersulfone, polyphenyleneoxide, polyphenylenesulfidro, polyethylenenaphthalene, polysulfone, cellulose acetate, and polystyrene, and mixtures thereof, and
   wherein the tortuosity is determined by dividing a distance a molecule moving within a pore travels between a first point and second point by a straight line distance between the first point and the second point, the first point located on the first side of the porous substrate and the second point located on the second side of the porous substrate.

2. An electrochemical device, comprising: a cathode, an anode, a separator interposed between the cathode and the anode, and an electrolyte solution, wherein the separator is a separator defined in claim 1.

3. The electrochemical device according to claim 2, wherein the electrochemical device is a lithium secondary battery.

4. A method for manufacturing a separator for an electrochemical device, the method comprising:
   irradiating a substrate with an ion beam, the substrate consisting of a single layer, the single layer comprising a polymer; and
   applying an etching solution to the irradiated substrate to form pores in the substrate, wherein the pores extend from a first side of the porous substrate to a second side of the porous substrate, the first side and the second side of the porous substrate separated by a thickness of the porous substrate,
   wherein the porous substrate has a permeation time of 5 to 500 s/100 cc and pores having a diameter from 1 to 100 nm,
   wherein the pores have a cylindrical shape, the cylindrical shape having little or no tortuous nature, where no tortuous nature is equivalent to a tortuosity of 1,
   wherein the polymer is selected from the group consisting of polyethylene, low density polyethylene, linear low density polyethylene, ultrahigh molecular weight polyethylene, polypropylene, polyethyleneterephthalate, polybutyleneterephthalate, polyester, polyacetal, polyamide, polycarbonate, polyimide, polyetheretherketone, polyethersulfone, polyphenyleneoxide, polyphenylenesulfidro, polyethylenenaphthalene, polysulfone, cellulose acetate, and polystyrene, and mixtures thereof, and wherein the tortuosity is determined by dividing a distance a molecule moving within a pore travels between a first point and second point by a straight line distance between the first point and the second point, the first point located on the first side of the porous substrate and the second point located on the second side of the porous substrate.

5. The method for manufacturing a separator for an electrochemical device according to claim 4, wherein the ion beam has an acceleration voltage in a range of 100 to 300 MeV.

6. The method for manufacturing a separator for an electrochemical device according to claim 4, wherein the etching solution is any one selected from the group consisting of sodium hydroxide (NaOH), potassium hydroxide (KOH), calcium hydroxide (Ca(OH)2), sodium hypochlorite (NaClO), and hydrogen peroxide (H2O2), or mixtures thereof.

7. The method for manufacturing a separator for an electrochemical device according to claim 4, wherein the etching solution has concentration from 1 to 10 M.

8. The method for manufacturing a separator for an electrochemical device according to claim 4, wherein the etching solution is applied to the film for 1 to 30 minutes.

9. The method for manufacturing a separator for an electrochemical device according to claim 4, wherein the ion beam is oriented at a right angle to the substrate.

* * * * *